(12) United States Patent
Niepceron et al.

(10) Patent No.: US 11,754,002 B2
(45) Date of Patent: Sep. 12, 2023

(54) EPICYCLIC REDUCTION GEAR FOR A TURBOMACHINE

(71) Applicant: SAFRAN TRANSMISSION SYSTEMS, Colombes (FR)

(72) Inventors: Clément Paul René Niepceron, Moissy-Cramayel (FR); Boris Pierre Marcel Morelli, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/626,216

(22) PCT Filed: Jul. 7, 2020

(86) PCT No.: PCT/FR2020/051203
§ 371 (c)(1),
(2) Date: Jan. 11, 2022

(87) PCT Pub. No.: WO2021/009435
PCT Pub. Date: Jan. 21, 2021

(65) Prior Publication Data
US 2022/0268215 A1 Aug. 25, 2022

(30) Foreign Application Priority Data

Jul. 16, 2019 (FR) ...................................... 1908012

(51) Int. Cl.
*F16H 57/08* (2006.01)
*F02C 7/36* (2006.01)
*F02C 7/06* (2006.01)

(52) U.S. Cl.
CPC .................. *F02C 7/36* (2013.01); *F02C 7/06* (2013.01); *F16H 57/082* (2013.01); *F05D 2260/40311* (2013.01)

(58) Field of Classification Search
CPC .... F16H 57/082; F16H 57/043; F16H 57/042; F16H 57/0482; F16H 57/0434; F16H 57/0441
See application file for complete search history.

(56) References Cited

U.S. PATENT DOCUMENTS 9,523,424 B2 * 12/2016 Altamura ............ F16H 57/0479
9,976,437 B2 * 5/2018 McCune .................. F02C 7/32
2018/0023483 A1 1/2018 Le Pache et al.

FOREIGN PATENT DOCUMENTS

DE 102016220487 A1 * 4/2018
DE 102016221756 A1 * 5/2018

(Continued)

OTHER PUBLICATIONS

Written Opinion of the International Searching Authority dated Nov. 3, 2020, issued in corresponding International Patent Application No. PCT/FR2020/051203, filed Jul. 7, 2020, 5 pages.

(Continued)

*Primary Examiner* — Derek D Knight
(74) *Attorney, Agent, or Firm* — Christensen O'Connor Johnson Kindness PLLC

(57) ABSTRACT

The invention relates to an epicyclic reduction gear for a turbomachine, including a sun wheel that is rotatable about a first axis (A); a ring gear surrounding the sun wheel and being rotatable about the first axis (A); at least one planetary gear that is rotatable about a second axis (B), the planetary gear being meshed with the sun wheel and the ring gear; an immobile planet carrier, the planetary gear being rotatably guided about the second axis (B) with respect to a bearing of the planet carrier; an item of equipment including a rotor. The invention is characterized in that the item of equipment is fastened to the bearing of the planet carrier and the rotor of the item of equipment is rotatably driven by the planetary gear.

9 Claims, 5 Drawing Sheets

(56) References Cited

FOREIGN PATENT DOCUMENTS

| EP | 2728140 | A2 | 5/2014 |
|----|---------|----|--------|
| EP | 3246546 | A1 | 11/2017 |
| FR | 3054264 | A1 | 1/2018 |

OTHER PUBLICATIONS

International Preliminary Report on Patentability dated Jan. 18, 2022, issued in corresponding International Patent Application No. PCT/FR2020/051203, filed Jul. 7, 2020, 1 page.

English Translation of the International Search Report dated Nov. 3, 2020, issued in corresponding International Patent Application No. PCT/FR2020/051203, filed on Jul. 7, 2020, 2 pages.

English Translation of the Written Opinion of the International Searching Authority dated Nov. 3, 2020, issued in corresponding International Patent Application No. PCT/FR2020/051203, filed on Jul. 7, 2020, 3 pages.

* cited by examiner

[Fig. 1]
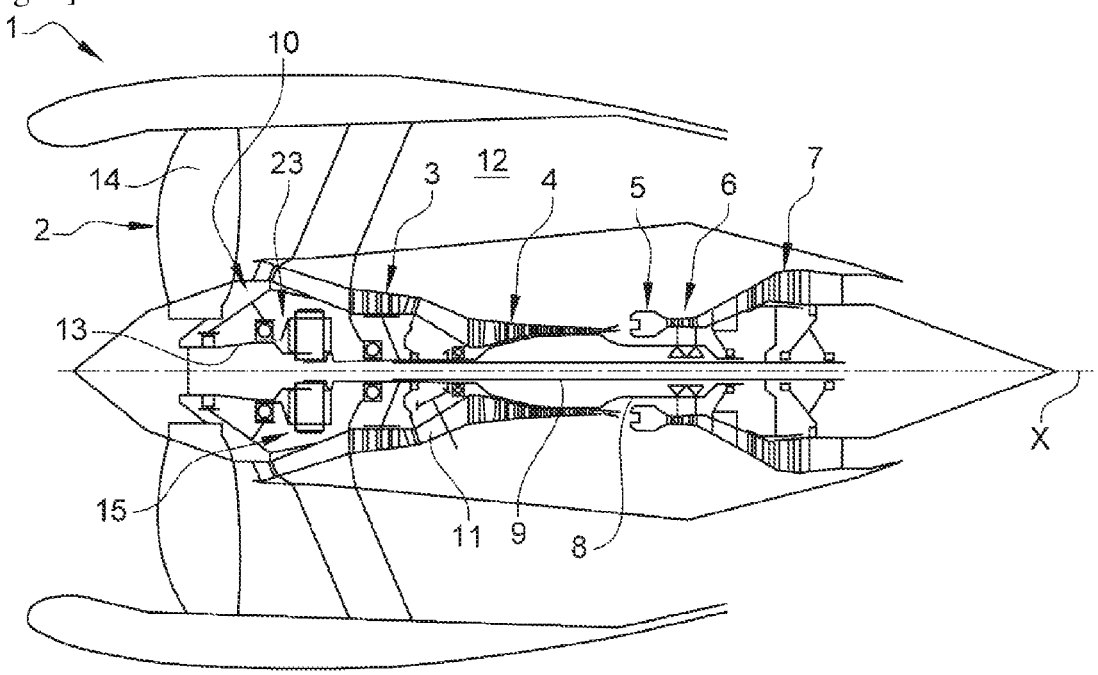

[Fig. 2]
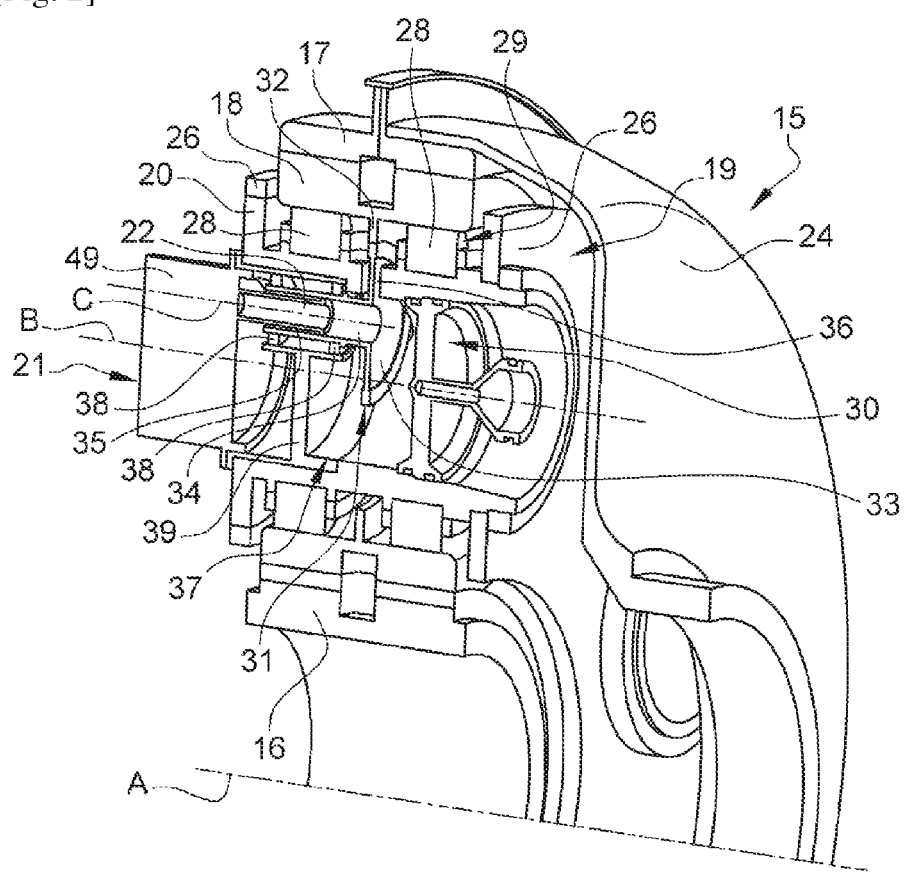

[Fig. 3]
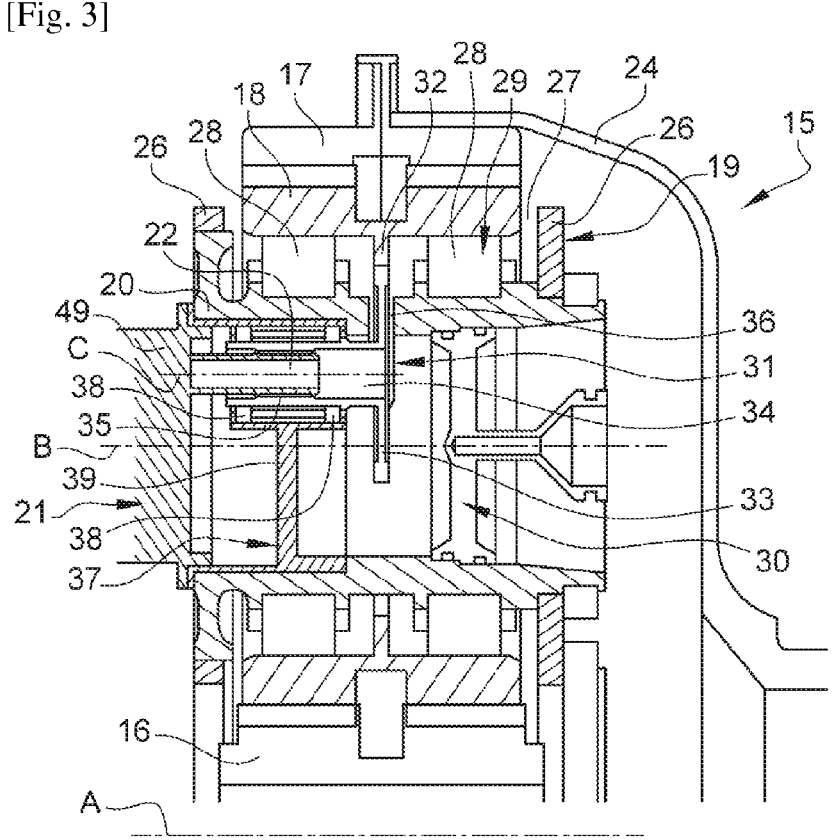

[Fig. 4]
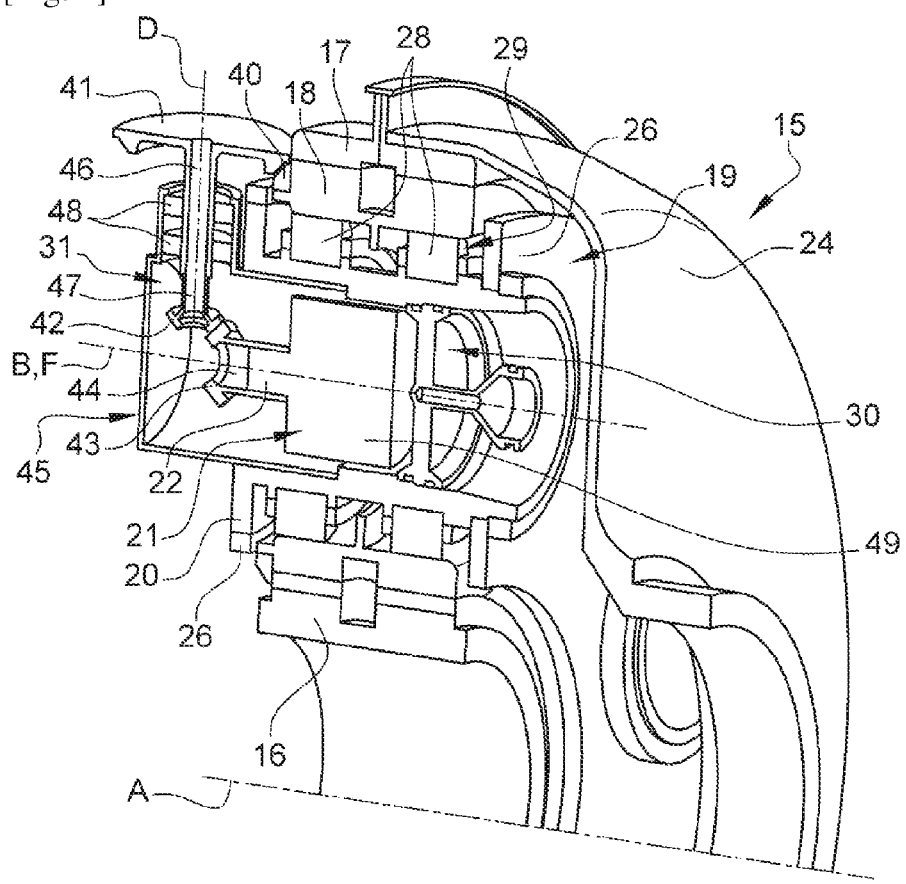

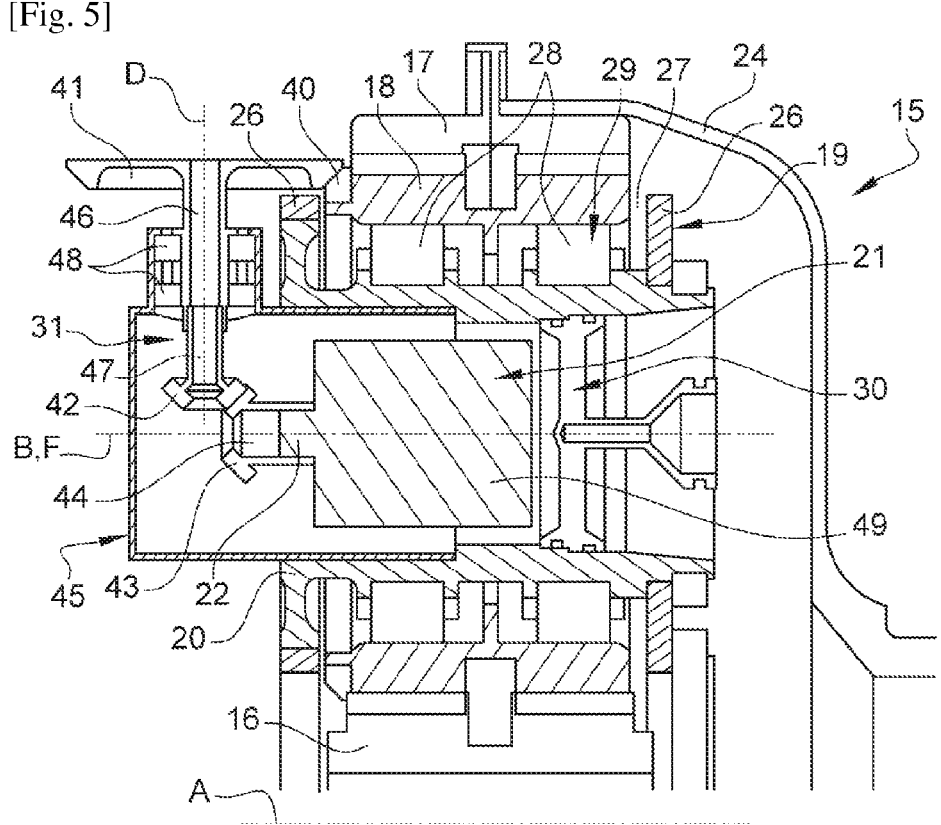
[Fig. 5]

EPICYCLIC REDUCTION GEAR FOR A TURBOMACHINE

CROSS-REFERENCES TO RELATED APPLICATIONS

This application is a National Stage of International Application No. PCT/FR2020/051203, filed Jul. 7, 2020, which claims priority to French Patent Application No. 1908012, filed Jul. 16, 2019, the entire disclosures of which are hereby incorporated by reference.

TECHNICAL FIELD

Embodiments of the present disclosure relate in particular to an epicyclic reduction gear for a turbomachine and to a turbomachine comprising such a reduction gear.

BACKGROUND

A turbomachine, such as a dual flow turbojet engine, typically comprises an air inlet comprising a ducted fan whose outlet air flow is divided into an air flow which enters a primary duct and forms a hot flow (or primary flow), and an air flow which flows into a secondary duct which extends around the primary duct and forms a cold flow (or secondary flow).

The turbomachine typically comprises, from upstream to downstream, in the direction of gas flow, at least one compressor, a combustion chamber, at least one turbine, and an ejection nozzle in which the combustion gases leaving the turbine (primary flow) are mixed with the secondary flow.

In the case of a turbomachine with reduction gear, a shaft of a turbine (hereinafter referred to as the turbine shaft) drives the shaft of the fan (hereinafter referred to as the fan shaft) by means of an epicyclic reduction gear. The reduction gear is usually located in an annular enclosure between the fan and the compressor, and allows to reduce the speed of rotation of the fan shaft relative to that of the turbine shaft.

As the name implies, an epicyclic reduction gear comprises an epicyclic gear train comprising at least one sun gear, one ring gear, one planet gear and one planet carrier. Depending on the requirements, such an epicyclic reduction gear can be configured in different ways.

In the following description, we will focus on the configuration commonly referred to as "planetary". More precisely, in such a configuration, the reduction gear has a sun gear secured to the turbine shaft, a ring gear secured to the fan shaft and an immobile (or fixed) planet carrier.

A turbomachine also classically comprises an accessory gearbox (AGB) generally disposed on a casing of the fan inside the nacelle. An AGB is designed to transmit a mechanical power drawn off from the engine of the turbomachine to items of equipment such as a pump, a starter-alternator, an air/oil separator, etc. Each item of equipment is fitted directly to the AGB.

It is known from the document FR-A1-3054264 in the name of the applicant to rotatably drive the rotor of an item of equipment via the sun gear of the reduction gear. Such an arrangement allows to move an item of equipment of the AGB into the enclosure in which the reduction gear is located, and thus to limit the space requirement of the AGB and consequently to reduce the dimensions of the nacelle. Such an arrangement may also allow for the addition of electrical or hydraulic item of equipment, so as to increase the available electrical or hydraulic power, without increasing the overall dimensions of the AGB.

However, such an arrangement is not compatible with all the turbomachine architectures since it requires a free space upstream of the sun gear (and more generally upstream of the reduction gear). Such a location is not available, for example, if the architecture of the turbomachine comprises a guiding for the turbine shaft in relation to the fan shaft upstream of the reduction gear.

The purpose of the present disclosure is thus to propose an epicyclic reduction gear provided with an item of equipment allowing the above-mentioned disadvantages to be remedied.

SUMMARY

The disclosure thus proposes an epicyclic reduction gear for a turbomachine comprising:
- a sun gear that is rotatable about a first axis A and adapted to be rotatably driven by a turbine of the turbomachine;
- a ring gear surrounding the sun gear and rotatable about the first axis A, the ring gear being adapted to rotatably drive a fan shaft;
- at least one planet gear that is rotatable about a second axis B, the planet gear being meshed with the sun gear and the ring gear;
- an immobile planet carrier, the planet gear being rotatably guided about the second axis B with respect to a bearing of the planet carrier; and
- an item of equipment comprising a rotor, wherein the item of equipment is fitted to the bearing of the planet carrier and the rotor of the item of equipment is rotatably driven by the planet gear.

Such an arrangement of the item of equipment is compatible with more turbomachine architectures.

When the reduction gear comprises several planet gears, each planet gear of the reduction gear can rotatably drive one or more item of equipment, so as to limit the overall dimension of the AGB (and therefore reduce the dimensions of the nacelle) and/or increase the electrical and/or hydraulic power available.

The reduction gear according to the disclosure may comprise one or more of the following characteristics and/or steps, taken alone or in combination with each other:
- the rotor of the item of equipment is rotatably driven by the planet gear via a gear train;
- the gear train is disposed entirely within the planet gear;
- the gear train comprises a spur gear between an inner toothing of the planet gear and a toothed wheel with outer toothing, the toothed wheel being rotatable about a third axis C offset with respect to the second axis B and parallel to the first and second axes A, B, the toothed wheel being secured to a drive shaft which is rotatable about the third axis C, the rotor of the item of equipment being rotatably coupled with the drive shaft via coupling means;
- a stator of the item of equipment is attached to the bearing of the planet carrier via a support, the drive shaft being rotatably guided with respect to the support via two bearings of the support which are spaced apart from each other;
- the gear train comprises a first bevel gear between an outer toothing of the planet gear and a first toothed wheel rotatable about a fourth axis D perpendicular to the first and second axes A, B and a second bevel gear between a second toothed wheel rotatable about the fourth axis D and a third toothed wheel rotatable about a fifth axis F parallel to the first and second axes A, B, the third toothed wheel being secured to a drive shaft, the rotor of the item of equipment being rotatably coupled with the drive shaft via coupling means;

a stator of the item of equipment is fitted to the bearing of the planet carrier via a support, the first and second toothed wheels being secured to a transmission shaft rotatable about the fourth axis D, the transmission shaft being rotatably guided with respect to the support via two bearings of the support which are distant from each other;

the coupling means comprise domed teeth engaged in axial splines;

the bearing of the planet carrier comprises rolling elements connected on the one hand to a ring of the bearing of the planet carrier and on the other hand to the planet gear, the reduction gear comprising means for conveying oil to the rolling elements, the oil conveying means being configured to convey oil to the item of equipment.

The present disclosure further relates to a turbomachine comprising a reduction gear as described above.

DESCRIPTION OF THE DRAWINGS

The disclosure will be better understood and other details, characteristics and advantages of the present disclosure will become clearer from the following description made by way of non-limiting example and with reference to the attached drawings, in which:

FIG. 1 is a schematic view in axial section of a turbomachine comprising a reduction gear according to the disclosure;

FIG. 2 is an axial half-section perspective view of a reduction gear according to a first embodiment;

FIG. 3 is an axial half-section view of the reduction gear according to the first embodiment;

FIG. 4 is an axial half-section perspective view of a reduction gear according to a second embodiment; and FIG. 5 is an axial half-section view of the reduction gear according to the second embodiment.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

FIG. 1 shows a turbomachine 1 with a reduction gear, which conventionally comprises, from upstream to downstream, in the direction of gas flow, a ducted fan 2 and an engine comprising a low-pressure compressor 3, a high-pressure compressor 4, a combustion chamber 5, a high-pressure turbine 6 and a low-pressure turbine 7. The rotors of the high-pressure compressor 4 and the high-pressure turbine 6 are connected by a high-pressure shaft 8 and together they form a high-pressure (HP) spool. The rotors of the low-pressure compressor 3 and the low-pressure turbine 7 are connected by a low-pressure shaft 9 and together they form a low-pressure (LP) spool.

By convention, in this application, the terms "upstream" and "downstream" are defined in relation to the direction of gas flow in the turbomachine. Axial" or "axially" means any direction parallel to the axis X of the turbomachine (axis of rotation of the high-pressure and low-pressure shafts), and "radial" or "radially" means any direction perpendicular to the axis X of the turbomachine. Also, by convention in the present application, the terms "internal", "external", "inner" and "outer" are defined radially with respect to the axis X of the turbomachine.

The air flow generated by the fan 2 is divided, by a flow-splitting nose of a fixed structure 10 of the turbomachine 1, into a primary air flow which enters a primary duct 11 and a secondary air flow which flows around the primary duct 11 in a secondary duct 12 and participates in a preponderant manner in the thrust provided by the turbomachine 1.

The fan 2 comprises a shaft 13 (hereinafter referred to as the fan shaft 13) carrying blades 14 and rotatably driven by the low-pressure shaft 9 via an epicyclic reduction gear 15. The fan shaft 13, the low-pressure shaft 9 and the high-pressure shaft 8 have a same axis of rotation which is coaxial with the axis X of the turbomachine 1.

According to the disclosure, the epicyclic reduction gear 15 comprises:

a sun gear 16 that is rotatable about a first axis A and is adapted to be rotatably driven by a turbine (in this case a low pressure turbine 7) of the turbomachine 1;

a ring gear 17 surrounding the sun gear 16 and rotatable about the first axis A, the ring gear 17 being adapted to rotatably drive the fan shaft 13;

at least one planet gear 18 that is rotatable about a second axis B, the planet gear 18 being meshed with the sun gear 16 and the ring gear 17;

an immobile (or fixed) planet carrier 19, the planet gear 18 being rotatably guided about the second axis B with respect to a bearing 29 of the planet carrier 19; and an item of equipment 21 (or accessory) comprising a rotor 22.

The item of equipment 21 is fitted to the bearing 29 of the planet carrier 19 and the rotor 22 of the item of equipment 21 is rotatably driven by the planet gear 18.

The epicyclic reduction gear 15 is thus of the "planetary" type. The reduction gear 15 allows the speed of the fan shaft 13 to be reduced relative to that of the low-pressure shaft 9.

The item of equipment 21 comprises a rotor 22 and a stator 49. The item of equipment 21 is for example a pump, an alternator, etc.

As shown in the FIGURES, more specifically, the reduction gear 15 is housed and lubricated in an annular enclosure 23 disposed between the fan 2 and the low-pressure compressor 3.

The sun gear 16 is central and rotatably coupled with the low-pressure shaft 9. The axis of rotation of the sun gear 16 (first axis A) is coaxial with the axis X of the turbomachine 1.

The ring gear 17 is flanged to a ring gear carrier 24 which is itself rotatably coupled to the fan shaft 13.

The reduction gear 15 comprises a plurality of planet gears 18 evenly distributed around the axis X between the sun gear 16 and the ring gear 17. Each planet gear 18 is jointly meshed with the sun gear 16 and the ring gear 17. Here, the planet gear 18 allows to rotatably drive a single item of equipment 21, but it could drive several ones. Similarly, each planet gear 18 of the reduction gear 15 may rotatably drive one or more item of equipment 21.

The planet carrier 19 is secured to the fixed structure 10 of the turbomachine 1 and is generally in the form of a cage supporting the planet gears 18. The planet carrier 19 thus comprises a peripheral wall bordered by two side walls 26.

The planet gears 18 are arranged between the side walls 26 of the planet carrier 19. For each of the planet gears 18, the peripheral wall comprises an opening 27, so as to allow the meshing between the planet gear 18 and the ring gear 17. Each planet gear 18 is passed through and rotatably guided with respect to a bearing 29 of the planet carrier 19, this bearing 29 being positioned and held in position with respect to the side walls 26 of the planet carrier 19. Each bearing 29 comprises a tubular ring 20 and two annular rows of rolling elements or rolling-members 28 (in this case cylindrical rollers) spaced from each other.

The rolling elements 28 of each of the rows are connected to the ring 20 of the bearing 29 of the planet carrier 19 and to the planet gear 18. The reduction gear 15 comprises means for conveying oil 30 to the rolling elements 28. Advantageously, the conveying means 30 are configured to convey oil to the item of equipment 21.

According to the embodiments illustrated in the FIGURES, the rotor 22 of the item of equipment 21 is rotatably driven by the planet gear 18 via a gear train 31. The rotor 22 of the item of equipment 21 could, for example, be driven by the planet gear 18 via a key connection, a spline and serration connection, a shrink connection, etc.

A gear train 31 allows to shift the rotation axis of the rotor 22 of the item of equipment 21 with respect to the rotation axis of the corresponding planet gear 18 (second axis B) and/or to modify the operating parameters of an item of equipment 21 (rotation speed, torque, etc.).

A gear train 31 has a defined transmission ratio so as to operate the item of equipment 21 in the desired operating range.

According to the first embodiment illustrated in FIGS. 2 and 3, the gear train 31 is disposed entirely within the planet gear 18. The gear train 31 comprises a spur gear between an inner toothing 32 of the planet gear 18 and a toothed wheel 33 with outer toothing. The toothed wheel 33 is rotatable about a third axis C offset from the second axis B and parallel to the first and second axes A, B. The toothed wheel 33 is secured to a drive shaft 34 rotatable about the third axis C, the rotor 22 of the item of equipment 21 being rotatably coupled with the drive shaft 34 via coupling means 35.

Specifically, the inner toothing 32 of the planet gear 18 is integrally formed with the body of the planet gear 18 so as to form an integral planet gear 18. The toothed wheel 33 with outer toothing is cylindrical. The toothed wheel 33 passes through the ring 20 of the bearing 29 via a slot 36, so as to allow the meshing of the toothed wheel 33 with the inner toothing 32 of the planet gear 18. The drive shaft 34 is integrally formed with the toothed wheel 33.

According to the first embodiment illustrated in FIGS. 2 and 3, the stator 49 of the item of equipment 21 is attached to the bearing 29 via a support 37. The drive shaft 34 is rotatably guided in relation to the support 37 via two roller bearings 38 spaced apart from each other.

Specifically, the support 37 is positioned and held in position in the ring 20 of the bearing 29. The stator 49 of the item of equipment 21 is positioned and held in position on the support 37. The support 37 is arranged opposite the ring gear carrier 24. The drive shaft 34 is rotatably guided via the two roller bearings 38 relative to a housing formed in a partition 39 of the support 37.

Advantageously, the coupling means 35 have an angular deflection. Such coupling means allow to compensate for existing misalignments between the toothed wheel 33 and the rotor 22 of the item of equipment 21.

The coupling means 35 are, for example, coupling means with domed toothing, commonly referred to as "domed splines", comprising domed teeth (in other words teeth each having a convex domed profile in axial section) engaged in axial splines. The domed teeth are either made in the rotor 22 of the item of equipment 21 or in the drive shaft 34.

According to the second embodiment illustrated in FIGS. 4 and 5, the gear train 31 comprises a first bevel gear between an outer toothing 40 of the planet gear 18 and a first toothed wheel 41 rotatable about a fourth axis D perpendicular to the first and second axes A, B. The gear train 31 further comprises a second bevel gear between a second toothed wheel 42 rotatable about the fourth axis D and a third toothed wheel 43 rotatable about a fifth axis F parallel to the first and second axes A, B. The third toothed wheel 43 is secured to a drive shaft 44, the rotor 22 of the item of equipment 21 being rotatably coupled with the drive shaft 44 via coupling means 35.

Specifically, the outer toothing 40 of the planet gear 18 may be integrally formed with the body of the planet gear 18 or fitted to the body of the planet gear 18. The first, second and third toothed wheels 41, 42, 43 are conical. The fifth axis F is coaxial with the second axis B.

According to the second embodiment illustrated in FIGS. 4 and 5, the stator 49 of the item of equipment 21 is fitted to the bearing 29 via a support 45. The first and second toothed wheels 41, 42 are secured to a drive shaft 46, 47 that is rotatable about the fourth axis D. The transmission shaft 46, 47 is rotatably guided with respect to the support 45 via two roller bearings 48 which are spaced apart from each other.

More specifically, the support 45 is in the form of a case. The support 45 is positioned and held in position with respect to the ring 20 of the bearing 29. The stator 49 of the item of equipment 21 is positioned and held in position in the support 45. The support 45 is arranged opposite the ring gear carrier 24. The drive shaft 46, 47 comprises a first shaft 46 and a second shaft 47 rotatably coupled to each other. The first shaft 46 is integrally formed with the first toothed wheel 41. The second shaft 47 is integrally formed with the second toothed wheel 42. The drive shaft 44 is integrally formed with the third toothed wheel 43. The first toothed wheel 41 is here outside the support 45. The drive shaft 46, 47 is rotatably guided via the two roller bearings 48 in relation to a housing formed in the support 45. The guiding of the drive shaft 44 is not shown in the FIGURES.

Advantageously, the coupling means 35 have an angular deflection. Such coupling means allow to compensate for existing misalignments between the third toothed wheel 43 and the rotor 22 of the item of equipment 21.

The coupling means 35 are, for example, coupling means with domed toothing, commonly referred to as "domed splines", comprising domed teeth (in other words teeth each having a convex domed profile in axial section) engaged in axial splines. The domed teeth are either made in the rotor 22 of the item of equipment 21 or in the drive shaft 44.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An epicyclic reduction gear for a turbomachine, comprising:
   a sun gear that is rotatable about a first axis and adapted to be rotatably driven by a turbine of the turbomachine;
   a ring gear surrounding the sun gear and being rotatable about the first axis, the ring gear being adapted to rotatably drive a fan shaft;
   at least one planet gear that is rotatable about a second axis, the at least one planet gear being meshed with the sun gear and the ring gear;
   an immobile planet carrier, the at least one planet gear being rotatably guided about the second axis with respect to a bearing of the planet carrier;
   an item of equipment comprising a rotor,
   wherein the item of equipment is fitted to the bearing of the planet carrier and the rotor of the item of equipment is rotatably driven by the at least one planet gear via a gear train.

2. The reduction gear according to claim 1, wherein the gear train is disposed entirely within the at least one planet gear.

3. The reduction gear according to claim 1, wherein the gear train comprises a spur gear between an inner toothing of the at least one planet gear and a toothed wheel with outer toothing, the toothed wheel being rotatable about a third axis offset with respect to the second axis and parallel to the first and second axes, the toothed wheel being secured to a drive shaft which is rotatable about the third axis, the rotor of the item of equipment being rotatably coupled with the drive shaft via coupling means.

4. The reduction gear according to claim 3, wherein a stator of the item of equipment is attached to the bearing of the planet carrier via a support, the drive shaft being rotatably guided with respect to the support via two bearings of the support which are spaced apart from each other.

5. The reduction gear according to claim 1, wherein the gear train comprises a first bevel gearing comprising an outer toothing of the at least one planet gear and a first toothed wheel rotatable about a fourth axis perpendicular to the first and second axes, and a second bevel gearing comprising a second toothed wheel rotatable about the fourth axis and a third toothed wheel rotatable about a fifth axis parallel to the first and second axes, the third toothed wheel being secured to a drive shaft, the rotor of the item of equipment being rotatably coupled with the drive shaft via coupling means.

6. The reduction gear according to claim 5, wherein a stator of the item of equipment is fitted to the bearing of the planet carrier via a support, the first and second toothed wheels being secured to a transmission shaft rotatable about the fourth axis, the transmission shaft being rotatably guided with respect to the support via two bearings of the support which are distant from each other.

7. The reduction gear according to claim 3, wherein the coupling means comprise domed teeth engaged in axial splines.

8. The reduction gear according to claim 1, wherein the bearing of the planet carrier comprises rolling elements connected to the bearing of the planet carrier and to the at least one planet gear, the reduction gear comprising means for conveying oil to the rolling elements.

9. A turbomachine comprising the reduction gear according to claim 1.

* * * * *